United States Patent [19]
Shinozaki

[11] 4,440,255
[45] Apr. 3, 1984

[54] AIR CLEANER APPARATUS FOR MOTORIZED TWO-WHEELED VEHICLE

[75] Inventor: Takashi Shinozaki, Tokorozawa, Japan

[73] Assignee: Honda Giken Kogyo Kabushiki Kaisha, Tokyo, Japan

[21] Appl. No.: 276,085

[22] Filed: Jun. 22, 1981

[30] Foreign Application Priority Data

Jun. 26, 1980 [JP] Japan .................................. 55-85863

[51] Int. Cl.³ ...................... B62K 11/08; B62K 19/30
[52] U.S. Cl. ................................ 180/225; 280/289 S
[58] Field of Search ................ 180/225, 289 R, 289 S; 55/385 B

[56] References Cited

U.S. PATENT DOCUMENTS

| | | | |
|---|---|---|---|
| 1,578,906 | 3/1926 | Morel | 180/225 |
| 2,329,248 | 9/1943 | Carlson | 55/385 B |
| 3,944,009 | 3/1976 | Katagiri | 280/289 R |
| 4,178,033 | 12/1979 | Muth et al. | 280/289 S |
| 4,321,978 | 3/1982 | Tominaga et al. | 55/385 B |

FOREIGN PATENT DOCUMENTS

| | | | |
|---|---|---|---|
| 1093245 | 11/1960 | Fed. Rep. of Germany | 180/225 |
| 1118632 | 11/1961 | Fed. Rep. of Germany | 180/225 |
| 935707 | 6/1948 | France | 180/225 |
| 505184 | 12/1954 | Italy | 180/225 |

*Primary Examiner*—David M. Mitchell
*Assistant Examiner*—Ross Weaver
*Attorney, Agent, or Firm*—Armstrong, Nikaido, Marmelstein & Kubovcik

[57] ABSTRACT

An air cleaner is provided on an upstream end portion of an intake air passage of an engine of a motorcycle and is fixed inside a fairing on the motorcycle ahead of the engine. The air intake opening of the air cleaner is directed inwardly of the fairing and can be positioned below the fuel tank. The air cleaner is provided on the inside of the fairing member opposite to a side stand on the motorcycle.

5 Claims, 2 Drawing Figures

AIR CLEANER APPARATUS FOR MOTORIZED TWO-WHEELED VEHICLE

BACKGROUND OF THE INVENTION

This invention relates to an air cleaner apparatus in a motorized two-wheeled vehicle such as a motorcycle or the like.

There has been hitherto known to provide a fairing member extending forwards and rearwards on a motorized two-wheeled vehicle. It is usual that inside the fairing member a certain amount of space is left between the fairing member and the vehicle body.

Therefore, it is desirable to effectively utilize such space.

An object of the present invention is to provide an apparatus which meets this desire.

In an apparatus including a vehicle body having front and rear wheels, an internal combustion engine at its middle portion, and with a fairing member in front of the engine extending forwards and rearwards, the invention comprises an air cleaner located at the upstream end portion of an intake passage of the engine fixedly provided inside the fairing member.

DETAILED DESCRIPTION OF A PREFERRED EMBODIMENT

Figure 1:
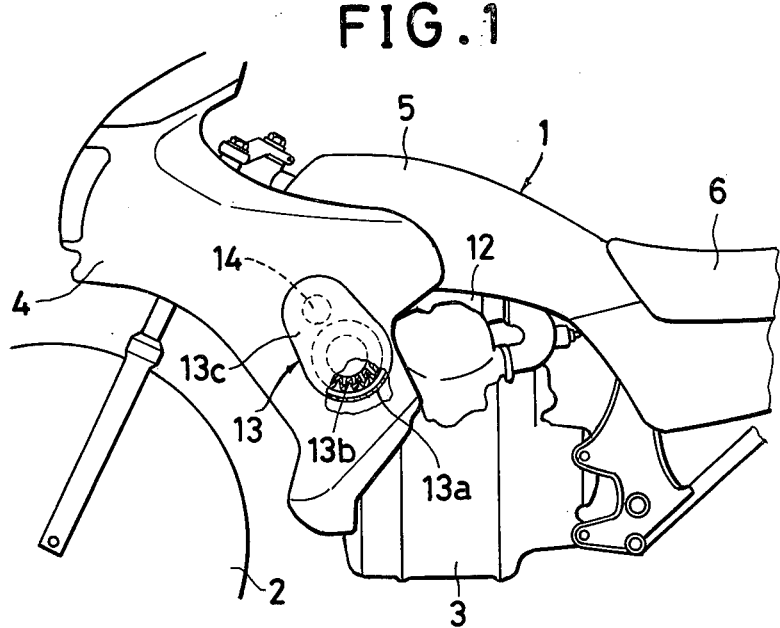
FIG. 1 is a side view of one embodiment of the invention.

One embodying example of this invention will now be explained with reference to the accompanying drawings:

A vehicle body 1 of a motorcycle has a front wheel 2, internal combustion engine 3 at its middle portion and in front of the engine 3, and a fairing member 4 extending forwards and rearwards. A fuel tank 5 is provided above the engine 3 and a driver's seat 6 is provided at the rear of the fuel tank 5.

The engine 3 is of the type that has a supercharger 11 comprising an exhaust turbine 8 provided in an exhaust passage 7 of the engine 3 and a compressor 10 provided in an intake passage 9 of the engine 3 arranged to be driven by the turbine 8. The intake passage 9 is provided on the downstream side of the compressor 10 with a pre-chamber 12, and at its upstream end portion with an air cleaner 13.

The air cleaner 13 comprises a cleaner casing 13a and a cleaner element 13b inside the cleaner casing 13a. The air cleaner 13 is fixedly provided on the inner surface of one side wall of the fairing member 4.

Figure 2:
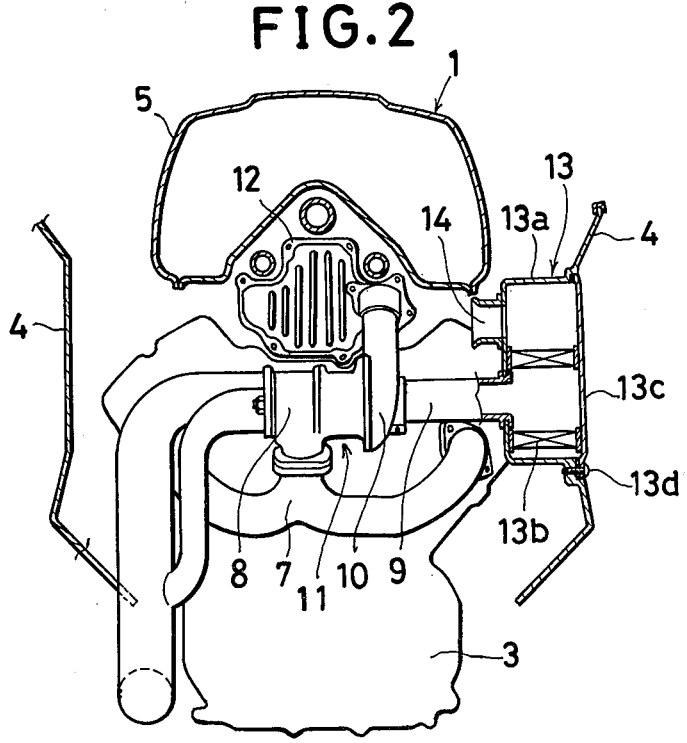
FIG. 2 is a front, partial sectional view of FIG. 1.

More in detail, as shown clearly in FIG. 2, the cleaner casing 13a is formed by casing in a part of the side wall of the fairing member 4 into an inwardly caved one, and a covering plate 13c is applied to an outward opening surface from outside thereof. The covering plate 13c is detachably fixed thereto by a screw 13d or the like, so that the element 13b is accessible from outside for being replaced with another one by simply detaching the covering plate 13c.

An external air intake opening 14 of the air cleaner 13 is provided. In the illustrated example, the intake opening 14 is formed as a tubular one projecting inwards from the inner wall of the foregoing cleaner casing 13a so as to protect the air cleaner 13 against rain water entering.

The vehicle body 1 is provided on one side surface thereof with a side stand for parking (not illustrated). In this case, the air cleaner 13 is provided on the side that is opposite to the side stand side. Consequently, on parking, the vehicle body 1 is more or less inclined towards the side, so that the intake opening 14 of the air cleaner is brought into such an inclined condition that the same is open to direct more or less downwards in accordance with the inclination of the vehicle body 1. The prevention of the entering of rain water is more improved.

Additionally, the intake opening 14 is located below the fuel tank 5, so that the tank 5 can serve as a penthouse covering the opening 14 from above.

Thus, according to this invention, the air cleaner on the upstream end portion of the intake passage of the engine is provided fixedly inside the fairing member, so that the space existing inside the fairing member can be effectively utilized, and an attaching member such as an attaching bracket or the like for the air cleaner can be omitted.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An air cleaner apparatus in a motorized two-wheeled vehicle including a vehicle body having front and rear wheels, an internal combustion engine at a middle portion between the wheels, and a fairing member in front of the engine extending forwards and rearwards, comprising an air cleaner located at an upstream end portion of an intake passage of the engine fixedly provided inside the fairing member, said air cleaner comprising a cleaner casing integrally formed in a side surface of said fairing member having an external air intake opening directed inwardly of said fairing member and a main opening facing outwardly of said fairing member, a removeable cleaner element in said casing, and a covering plate removeably covering and sealing said main opening.

2. An apparatus as claimed in claim 1, wherein the air cleaner is fixedly provided on the inside of the fairing member that is opposite to a side of the vehicle body having a side stand.

3. An apparatus as claimed in claim 1, wherein said external air intake opening of the air cleaner is positioned below a fuel tank provided on the vehicle body.

4. An apparatus as claimed in claim 2, wherein an external air intake opening of the air cleaner is positioned below a fuel tank provided on the vehicle body.

5. An apparatus as claimed in claims 1 wherein the air cleaner is fixedly provided on the inside of the fairing member that is opposite to a side of the vehicle body having a side stand and said an external air intake opening is directed inwardly of the fairing towards said side of said vehicle having said side stand.

* * * * *